United States Patent
Liu et al.

(10) Patent No.: US 8,687,544 B2
(45) Date of Patent: Apr. 1, 2014

(54) APPARATUS FOR DISTRIBUTING DATA TRAFFIC IN HETEROGENEOUS WIRELESS NETWORKS

(75) Inventors: Xiaoyu Liu, Yongin-si (KR); Su Won Lee, Seongnam-si (KR); Byung Suk Kim, Uiwang-si (KR); Byoung-Joon Lee, Seongnam-si (KR); Marius-Iulian Corici, Berlin (DE)

(73) Assignees: Samsung Electronics Co., Ltd., Suwon-si (KR); Fraunhofer-Gesellschaft zur Foerderung der Angewandten Forschung e.V., Munich (DE)

( * ) Notice: Subject to any disclaimer, the term of this patent is extended or adjusted under 35 U.S.C. 154(b) by 1347 days.

(21) Appl. No.: 12/127,296

(22) Filed: May 27, 2008

(65) Prior Publication Data

US 2009/0190524 A1     Jul. 30, 2009

(30) Foreign Application Priority Data

Jan. 24, 2008 (KR) .................. 10-2008-0007612

(51) Int. Cl.
*H04W 4/00* (2009.01)
(52) U.S. Cl.
USPC .......................................... 370/328
(58) Field of Classification Search
USPC .................. 370/328, 353, 332
See application file for complete search history.

(56) References Cited

U.S. PATENT DOCUMENTS

| | | | | |
|---|---|---|---|---|
| 6,420,687 B1* | 7/2002 | Ozawa et al. | ............... | 219/702 |
| 7,352,702 B2* | 4/2008 | Rosier | ............. | 370/236 |
| 7,373,501 B2* | 5/2008 | Arima et al. | ............... | 713/150 |
| 7,737,896 B1* | 6/2010 | Suri et al. | ............... | 343/702 |
| 2002/0046292 A1* | 4/2002 | Tennison et al. | ............... | 709/238 |
| 2002/0162026 A1* | 10/2002 | Neuman et al. | ............... | 713/201 |
| 2004/0072565 A1 | 4/2004 | Nobukiyo et al. | | |
| 2006/0025150 A1 | 2/2006 | Kim et al. | | |
| 2006/0050736 A1* | 3/2006 | Segel | ............. | 370/474 |
| 2009/0124233 A1* | 5/2009 | Morris | ............. | 455/406 |

FOREIGN PATENT DOCUMENTS

| | | |
|---|---|---|
| JP | 2003-051842 | 2/2003 |
| JP | 2003-296280 | 10/2003 |
| KR | 10-2005-0016603 | 2/2005 |
| KR | 10-2006-0076239 | 7/2006 |
| WO | WO 01-50790 | 7/2001 |
| WO | WO 2007-028252 | 3/2007 |

* cited by examiner

*Primary Examiner* — Mark Rinehart
*Assistant Examiner* — Mohammad Anwar
(74) *Attorney, Agent, or Firm* — NSIP Law

(57) ABSTRACT

An apparatus for distributing data traffic in heterogeneous wireless networks is provided. A terminal for transmitting data to a plurality of wireless networks, includes a transmission rule storing unit to store a data transmission rule with respect to the plurality of wireless networks, a data dividing unit to divide first data into a plurality of first data groups based on the stored data transmission rule, a transmission network selecting unit to select an individual transmission network for each divided data group from the plurality of wireless networks based on the determined data transmission rule, and a network access unit to transmit each data group to the selected transmission network.

19 Claims, 5 Drawing Sheets

APPARATUS FOR DISTRIBUTING DATA TRAFFIC IN HETEROGENEOUS WIRELESS NETWORKS

CROSS-REFERENCE TO RELATED APPLICATION

This application claims the benefit under 35 U.S.C. §119(a) of a Korean Patent Application No. 10-2008-0007612, filed on Jan. 24, 2008, in the Korean Intellectual Property Office, the entire disclosure of which is incorporated herein by reference.

TECHNICAL FIELD

The following description relates to an apparatus for distributing data traffic in heterogeneous wireless networks, and more particularly, to a technology by which a terminal and a network apparatus may share a data transmission rule for distributing the data traffic.

BACKGROUND

Services including data communication, visual communication, and the like may be used by mobile terminals due to developments in mobile communication technology. Also, recently, at least two wireless networks providing the services including voice communication, data communication, visual communication, and the like are installed in the same area.

As wireless networks providing similar services increase, terminals accessing a plurality of networks increase. The at least two wireless networks providing the services desired by a specific terminal may exist in an area where the specific terminal is located. Each wireless network may have a different communication scheme. Also, a Quality of Service (QoS), a bandwidth, and a time delay which are provided by each wireless network may be different from each other. The terminal accessing the plurality of networks may transmit data via any one of the plurality of networks, and may distributively transmit the data via the plurality of networks.

The terminal may distributively transmit the data so that data traffic may not be concentrated on a specific network of the plurality of networks. A network apparatus recomposes the distributively-transmitted data into the received data that is the same as the data transmitted by the terminal.

The terminal distributively transmits the data based on a data transmission rule, and the network apparatus recomposes the data distributively transmitted based on the data transmission rule.

The network apparatus shares the data transmission rule with the terminal in order to recompose the distributively-transmitted data. However, a specific method by which the network apparatus shares the data transmission rule with the terminal is not disclosed.

Accordingly, there is a need for a technology by which the network apparatus and the terminal share the data transmission rule, distributively transmit the data based on the shared data transmission rule, and recompose the distributively-transmitted data.

SUMMARY

According to an aspect, there is provided a terminal for transmitting data to a plurality of wireless networks, the terminal including a transmission rule storing unit to store a data transmission rule with respect to the plurality of wireless networks, a data dividing unit to divide first data into a plurality of first data groups based on the stored data transmission rule, a transmission network selecting unit to select an individual transmission network for each divided data group from the plurality of wireless networks based on the determined data transmission rule, and a network access unit to transmit each data group to the selected transmission network.

According to another aspect, there is provided a network apparatus including a transmission rule receiving unit to receive a data transmission rule from a terminal, a data receiving unit to receive, from the terminal via a plurality of wireless networks, data divided into a plurality of received data groups, and a network access unit to recompose the received data from the plurality of received data groups based on the received data transmission rule.

According to still another aspect, there is provided a network apparatus for controlling a plurality of wireless networks accessing a terminal, the apparatus including a transmission rule determining unit to determine a data transmission rule with respect to the plurality of wireless networks, a data dividing unit to divide transmission data into a plurality of transmission data groups based on the determined data transmission rule, a transmission network selecting unit to select an individual transmission network for each divided transmission data group from the plurality of wireless networks based on the determined data transmission rule, and a data transmitting unit to transmit each transmission data group to the terminal via the selected transmission network.

According to yet another aspect, there is provided a terminal and a network apparatus which shares a data transmission rule so that the terminal accessing heterogeneous wireless networks distributively transmits data to the heterogeneous wireless networks.

Other features will become apparent to those skilled in the art from the following detailed description, which, taken in conjunction with the attached drawings, discloses exemplary embodiments of the invention.

BRIEF DESCRIPTION OF THE DRAWINGS

Throughout the drawings and the detailed description, the same drawing reference numerals will be understood to refer to the same elements, features, and structures.

DETAILED DESCRIPTION

The following detailed description is provided to assist the reader in gaining a comprehensive understanding of the methods, apparatuses and/or systems described herein. Accordingly, various changes, modifications, and equivalents of the systems, apparatuses and/or methods described herein will be suggested to those of ordinary skill in the art. Also, descriptions of well-known functions and constructions are omitted to increase clarity and conciseness.

Figure 1:
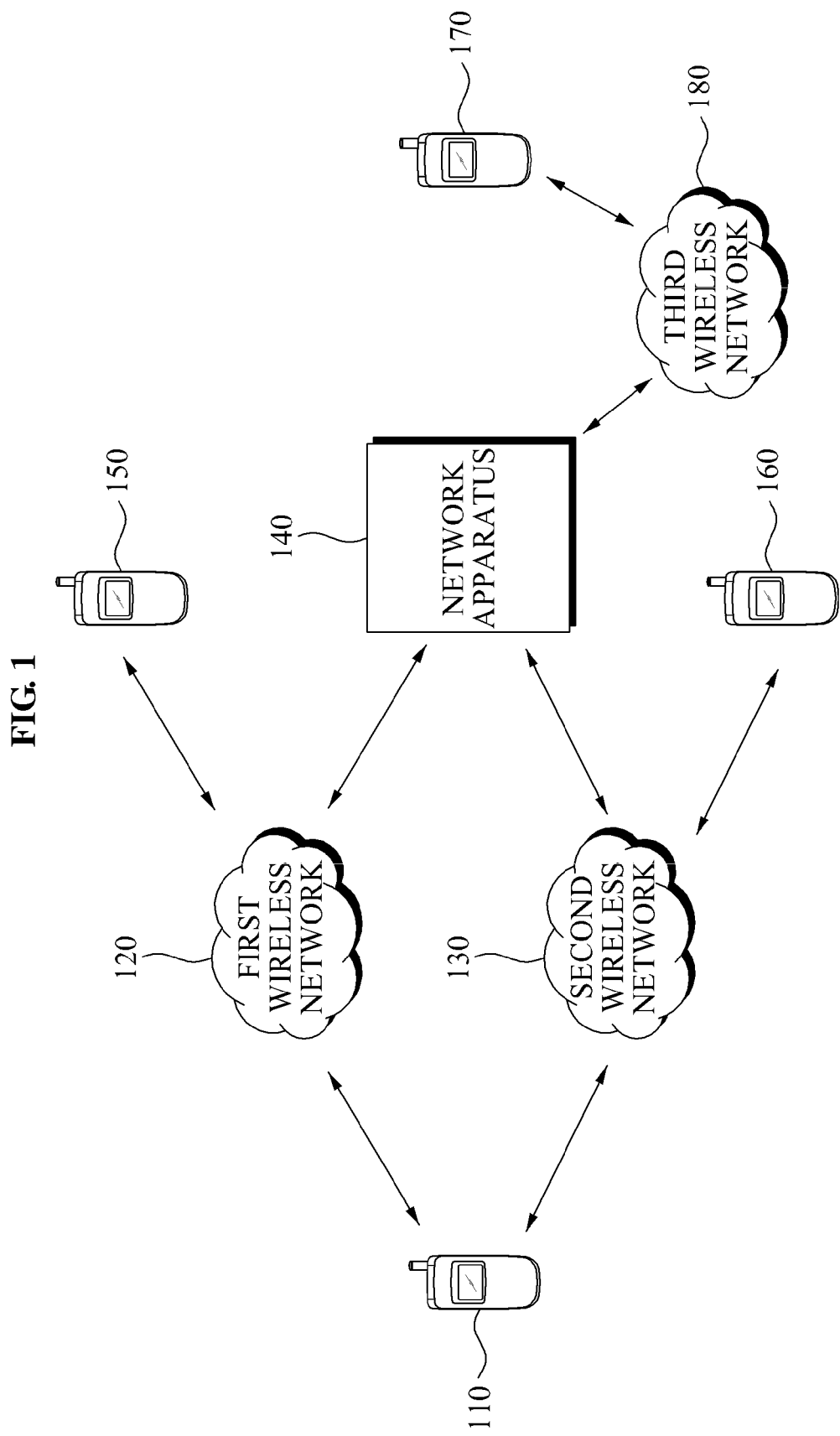
FIG. 1 is a diagram illustrating a terminal and a network apparatus for distributing data traffic using heterogeneous wireless networks according to an exemplary embodiment.

FIG. 1 illustrates that a terminal 110 and a network apparatus 140 to distribute data traffic using heterogeneous wireless networks according to an exemplary embodiment.

Referring to FIG. 1, a first terminal 110 may access a plurality of wireless networks 120 and 130. The plurality of wireless networks 120 and 130 are heterogeneous wireless networks. According to an exemplary embodiment, the first wireless network 120 may be a mobile telephone network optimized for communication of a circuit switching scheme of a voice signal and the like. The second wireless network 130 may be a wireless local area network (LAN) optimized for communication of a packet switching scheme of a data signal and the like.

The first terminal 110 may select an appropriate wireless network from the first wireless network 120 and the second wireless network 130 based on a characteristic of a used service, and may transmit data using the selected wireless network. According to an exemplary embodiment, the first terminal 110 may access the first wireless network 120 when transmitting voice data, and may access the second wireless network 130 when transmitting packet data.

The first terminal 110 may implement a plurality of applications, and each application may transmit different types of data. According to an aspect, a web browser implemented in the first terminal 110 may transmit packet data, and a voice call application may transmit voice data. The voice data may be transmitted to a third terminal 150 via the first wireless network 120, and the packet data may be transmitted to a fourth terminal 160 via the second wireless network 130.

The first wireless network 120 and the second wireless network 130 may transmit different types of data, however, where the different data transmitted from the first terminal 110 are concentrated on a specific wireless network, another wireless network may not be operated efficiently. Accordingly, the data traffic may be distributed by transmitting the data appropriate for each wireless network 120 and 130.

According to another exemplary embodiment, the first terminal 110 may transmit the data of the same type to a second terminal 170 using the plurality of wireless networks 120, 130, and 180. The first terminal 110 may divide the data to pass through the plurality of wireless networks 120 and 130, and may distributively transmit each divided data to the second terminal 170 via the plurality of wireless networks 120, 130, and 180. The network apparatus 140 may recombine each distributively-transmitted data, restore the data transmitted by the first terminal 110, and transmit the restored data to the second terminal 170.

According to still another exemplary embodiment, the network apparatus 140 may divide the data transmitted by the second terminal 170, and distributively transmit the divided data to the first terminal 110 to pass through the plurality of wireless networks 120, and 130. The first terminal 110 may recombine the distributively-transmitted data, and restore the data transmitted by the second terminal 170.

According to an exemplary embodiment, the first terminal 110 or the network apparatus 140 may include a predetermined data transmission rule and distributively transmit the data transmitted referring to the data transmission rule. Also, the first terminal 110 or the network apparatus 140 having received the distributively-transmitted data may recombine the distributively-transmitted data referring to the data transmission rule. The first terminal 110 and the network apparatus 140 may include the same data transmission rule, and distributively transmit or recombine the data.

According to an exemplary embodiment, the first terminal 110 may determine the data transmission rule, and transmit the determined data transmission rule to the network apparatus 140. The network apparatus 140 may distributively transmit or recombine the data referring to the transmitted data transmission rule.

According to another exemplary embodiment, the network apparatus 140 may determine the data transmission rule, and transmit the determined data transmission rule to the first terminal 110. The first terminal 110 may distributively transmit or recombine the data referring to the transmitted data transmission rule.

While the network apparatus 140 is illustrated as a single apparatus in FIG. 1, as an exemplary embodiment, it is understood that a plurality of network apparatuses may interoperate with each other and perform a function of the network apparatus.

Figure 2:
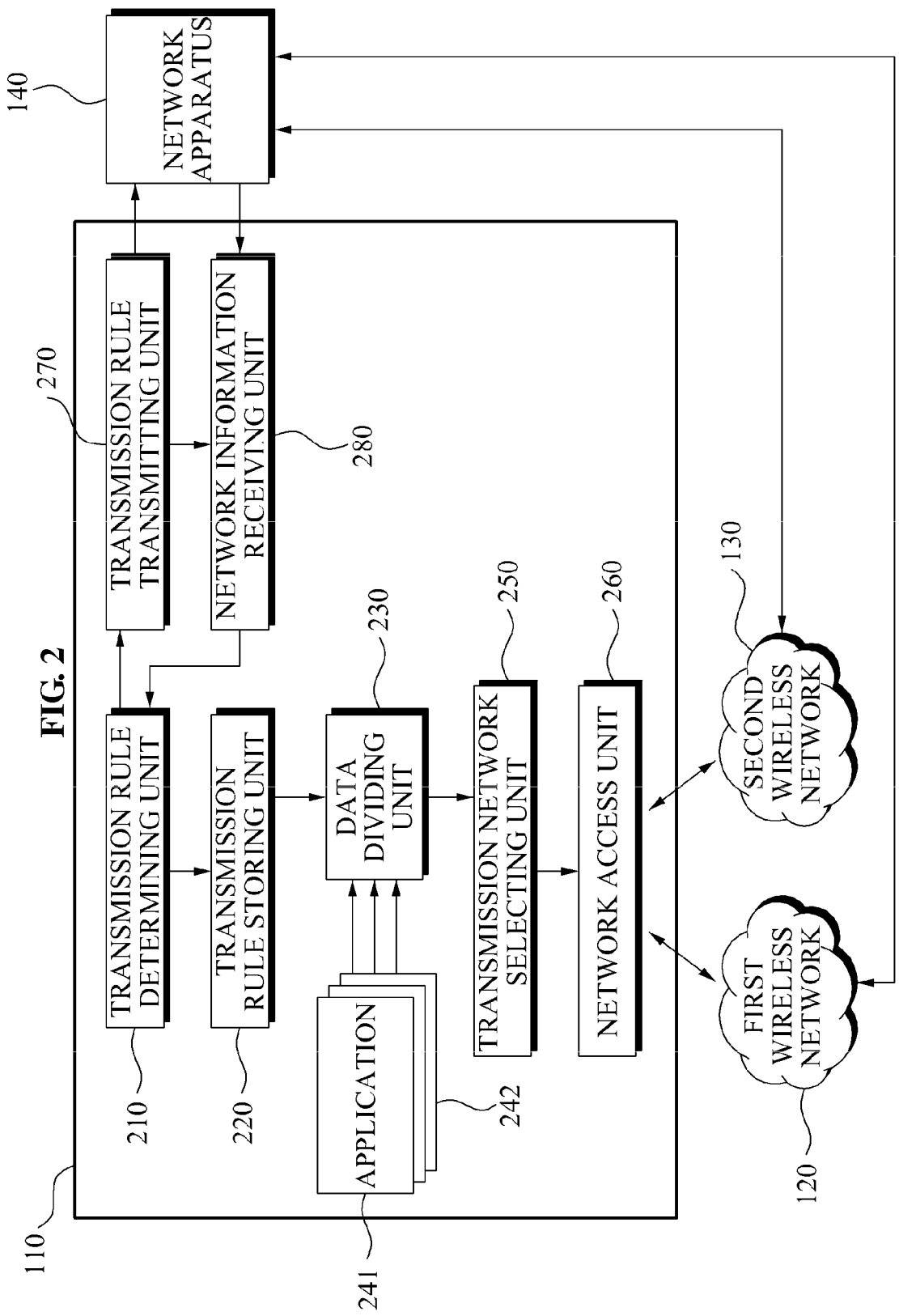
FIG. 2 is a block diagram illustrating a structure of a terminal to determine a data transmission rule for distributing data traffic, and to transmit the determined data transmission rule to a network apparatus according to an exemplary embodiment.

FIG. 2 is a block diagram illustrating a structure of a terminal 110 to determine a data transmission rule for distributing data traffic, and to transmit the determined data transmission rule to a network apparatus 140 according to an exemplary embodiment. The terminal 110 according to an exemplary embodiment includes a transmission rule determining unit 210, a transmission rule storing unit 220, a data dividing unit 230, a transmission network selecting unit 250, a transmission rule transmitting unit 270, a network information receiving unit 280, and a network access unit 260.

The transmission rule determining unit 210 determines the data transmission rule with respect to the plurality of wireless networks 120 and 130.

The transmission rule transmitting unit 270 transmits the data transmission rule determined by the transmission rule determining unit 210 to the network apparatus 140 to control the plurality of wireless networks 120 and 130.

The transmission rule storing unit 220 stores the data transmission rule with respect to the plurality of wireless networks 120 and 130. According to an aspect, the transmission rule storing unit 220 may store the data transmission rule determined by the transmission rule determining unit 210.

The data dividing unit 230 divides first data into a plurality of first data groups based on the stored data transmission rule.

The transmission network selecting unit 250 selects an individual transmission network for each divided data group from the plurality of wireless networks 120 and 130 based on the data transmission rule.

The network access unit 260 transmits each first data group to the selected transmission network.

According to an aspect, each data group is transmitted to the network apparatus 140 via the transmission network. The plurality of first data groups transmitted to the network apparatus 140 is recomposed into the first data based on the data transmission rule transmitted to the network apparatus 140 by the transmission rule transmitting unit 270.

The terminal 110 may implement a plurality of applications 241 and 242. Each application may generate the data of different types associated with a characteristic of each application.

According to an exemplary embodiment, the first application 241 may generate packet data as a web browser. Also, according to an exemplary embodiment, the second application 242 may generate voice data as a voice call. A voice call application may not be sensitive to errors in the voice data, however, may be sensitive to even a relatively small transmission delay of the voice data. Also, packet data may not be sensitive to a slight transmission delay, however, may be sensitive to errors in the data. According to an aspect, the first data includes data respectively generated by the plurality of applications 241 and 242, and the transmission rule determining unit 210 may determine the data transmission rule based on a characteristic of the plurality of applications 241 and 242. The transmission rule determining unit 210 may determine the data transmission rule so that the voice data may be transmitted to a wireless network of a circuit switching scheme, and the packet data may be transmitted to a wireless network of a packet switching scheme.

According to an aspect, a plurality of data groups transmitted via each wireless network is transmitted to the network apparatus 140. The network apparatus 140 may recompose the first data from the plurality of data groups based on the data transmission rule.

Since the data generated by the plurality of applications 241 and 242 implemented in the terminal 110 are transmitted via each wireless network 120 and 130, are recomposed in the network apparatus 140, the data traffic between the plurality of wireless networks 120 and 130 is distributed. Since the traffic is not concentrated on only a specific wireless network and is distributed to the plurality of wireless networks, a wireless network operator may efficiently utilize each wireless network.

The network information receiving unit 280 receives, from the network apparatus 140, network information including at least one of an error rate with respect to the plurality of wireless networks 120 and 130, data traffic information with respect to the plurality of wireless networks 120 and 130, and a transmission delay time with respect to the plurality of wireless networks 120 and 130. According to an exemplary embodiment, the transmission rule determining unit 210 determines the data transmission rule based on the received network information.

According to an exemplary embodiment, the transmission rule determining unit 210 may transmit the voice data to the wireless network having a high error rate, and transmit the packet data to the wireless network having a low error rate.

According to another exemplary embodiment, the transmission rule determining unit 210 may determine the data transmission rule to transmit the first data to the wireless network currently having a small amount of data traffic from among the plurality of wireless networks 120 and 130.

According to still another exemplary embodiment, the transmission rule determining unit 210 may determine the data transmission rule to transmit the voice data to the wireless network having a short transmission delay time, and to transmit the packet data to the wireless network having a long transmission delay time.

According to yet another exemplary embodiment, the transmission rule determining unit 210 determines the data transmission rule based on Quality of Service (QoS) information about a service associated with the first data or minimum bandwidth information about the service associated with the first data. Where the service associated with the first data is a voice service, the transmission rule determining unit 210 may determine the data transmission rule to transmit the first data to the wireless network providing a narrow bandwidth from among the plurality of wireless networks based on the minimum bandwidth information requested by the voice service. Also, where the service associated with the first data is credit information of a user or financial information of the user, and a high QoS is requested, the transmission rule determining unit 210 may determine the data transmission rule to transmit the first data to the wireless network supporting an Automatic Repeat reQuest (ARQ) scheme.

According to a further exemplary embodiment, the transmission rule determining unit 210 may determine the data transmission rule to first transmit the data to the wireless network having a relatively low data transmission cost based on the data transmission cost of each wireless network.

According to an exemplary embodiment, the transmission rule transmitting unit 270 encrypts and transmits the data transmission rule based on a predetermined encryption scheme. Where the data transmission rule is exposed to an external hacker and the like when transmitting the data transmission rule from the terminal 110 to the network apparatus 140, the hacker may recombine the data transmitted from the terminal 110 to the network apparatus 140. Where the data transmitted from the terminal 110 to the network apparatus 140 is data including credit information of the user, financial information of the user, and the like, the credit information of the user, the financial information of the user, and the like may be illicitly used by the hacker. The transmission rule transmitting unit 270 may protect the data of the user by encrypting the data transmission rule.

According to an exemplary embodiment, the predetermined encryption scheme may be an Internet Key Exchange (IKE)/Internet Protocol security protocol (IPsec) scheme. IPsec is an Internet standard for protecting an IP packet in a network layer, and denotes a set of a security protocol and an encryption algorithm supporting integrity with respect to the IP packet, authentication, and a confidential security service in the Internet vulnerable to security. Also, IPsec is a communication protocol of realizing a secure communication in the Internet having security vulnerabilities, and is the communication protocol for constructing an available virtual exclusive circuit such as an exclusive circuit on the Internet, and preventing an activity including eavesdropping the data and the like.

According to an exemplary embodiment, the transmission rule determining unit 210 may update the data transmission rule based on constantly-varying states of the plurality of wireless networks 120 and 130. The transmission rule transmitting unit 270 may transmit the updated data transmission rule to the network apparatus 140. The transmission network selecting unit 250 may distributively transmit the data via the plurality of wireless networks 120 and 130 based on the updated data transmission rule. The network apparatus 140 may easily recompose the data distributively transmitted based on the updated data transmission rule into the received data.

Figure 3:
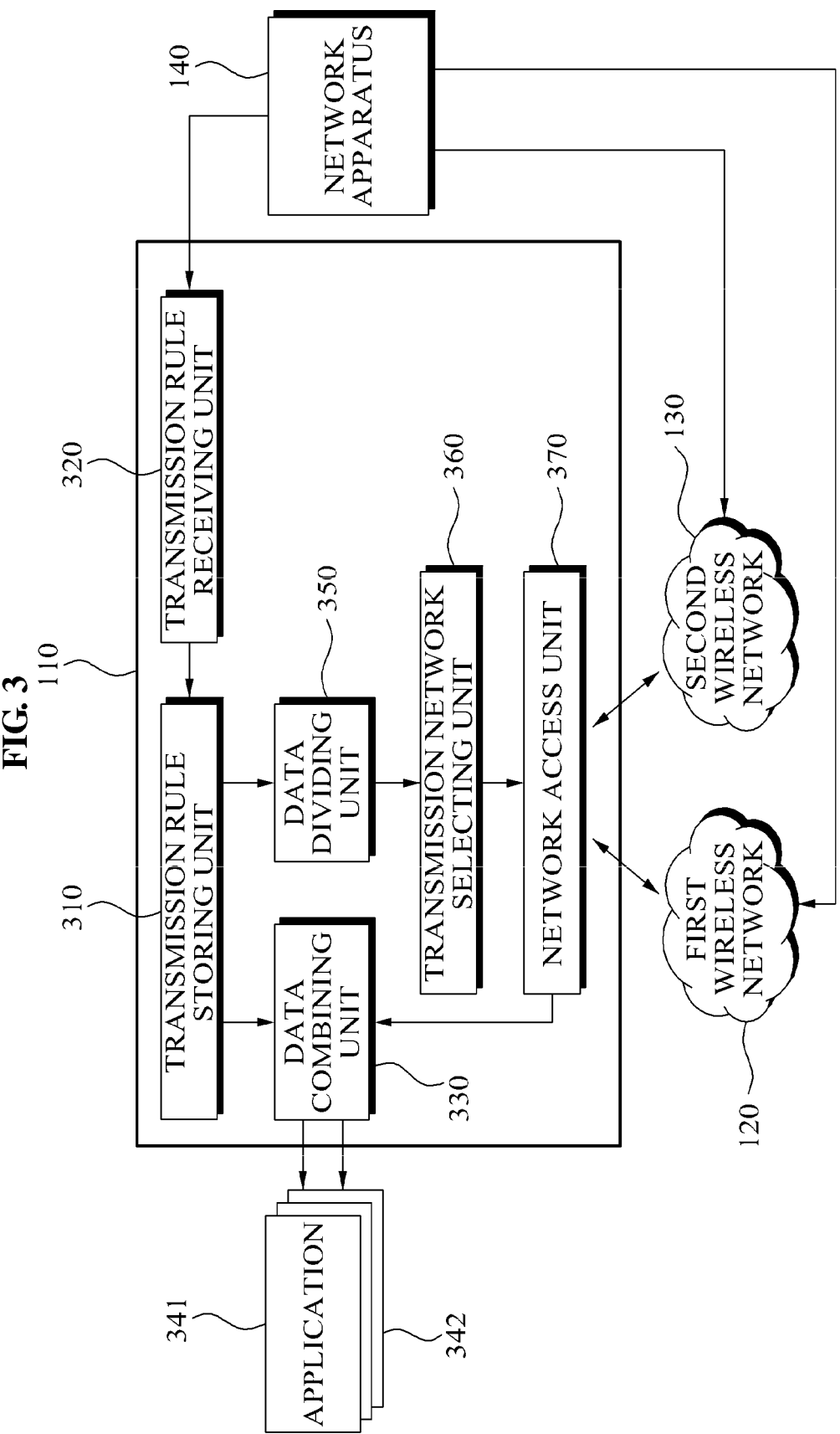
FIG. 3 is block diagram illustrating a structure of a terminal to receive a data transmission rule for distributing data traffic according to an exemplary embodiment.

FIG. 3 is block diagram illustrating a structure of a terminal 110 to receive a data transmission rule for distributing data traffic according to an exemplary embodiment. Referring to FIG. 3, the terminal 110 according to an exemplary embodiment includes a transmission rule storing unit 310, a transmission rule receiving unit 320, a data combining unit 330, a data dividing unit 350, a transmission network selecting unit 360, and a network access unit 370.

In the exemplary embodiment of the terminal 110 illustrated in FIG. 3, since operations of the transmission rule storing unit 310, the data dividing unit 350, the transmission network selecting unit 360, and the network access unit 370 are similar to operations of the transmission rule storing unit 220, the data dividing unit 230, the transmission network selecting unit 250, and the network access unit 260, respectively, in the exemplary embodiment described with reference to FIG. 2, detailed descriptions thereof are omitted.

The transmission rule receiving unit 320 receives the data transmission rule with respect to the plurality of wireless networks 120 and 130 from the network apparatus 140.

According to an exemplary embodiment, the received data transmission rule is stored in the transmission rule storing unit 310.

According to an exemplary embodiment, the transmission rule receiving unit 320 receives the data transmission rule encrypted based on a predetermined encryption scheme. The transmission rule receiving unit 320 may receive the data transmission rule encrypted based on an IKE/IPsec protocol, decrypt the data transmission rule, and store the decrypted data transmission rule in the transmission rule storing unit 310.

The network access unit 370 receives the data from the network apparatus 140. The network apparatus 140 may divide second data into a plurality of second data groups based on the data transmission rule, and the network access unit 370 may receive the second data divided into the plurality of second data groups via the plurality of wireless networks 120 and 130.

The data combining unit 330 recomposes the second data from the plurality of second data groups based on the data transmission rule stored in the transmission rule storing unit 310. The data combining unit 330 may transmit the recomposed second data to a plurality of applications 341 and 342.

According to an exemplary embodiment, where the network apparatus 140 updates the data transmission rule based on states of the plurality of wireless networks 120 and 130, and distributively transmits the second data via the plurality of wireless networks 120 and 130 based on the updated data transmission rule, the data combining unit 330 may recompose the second data based on the updated data transmission rule.

Figure 4:
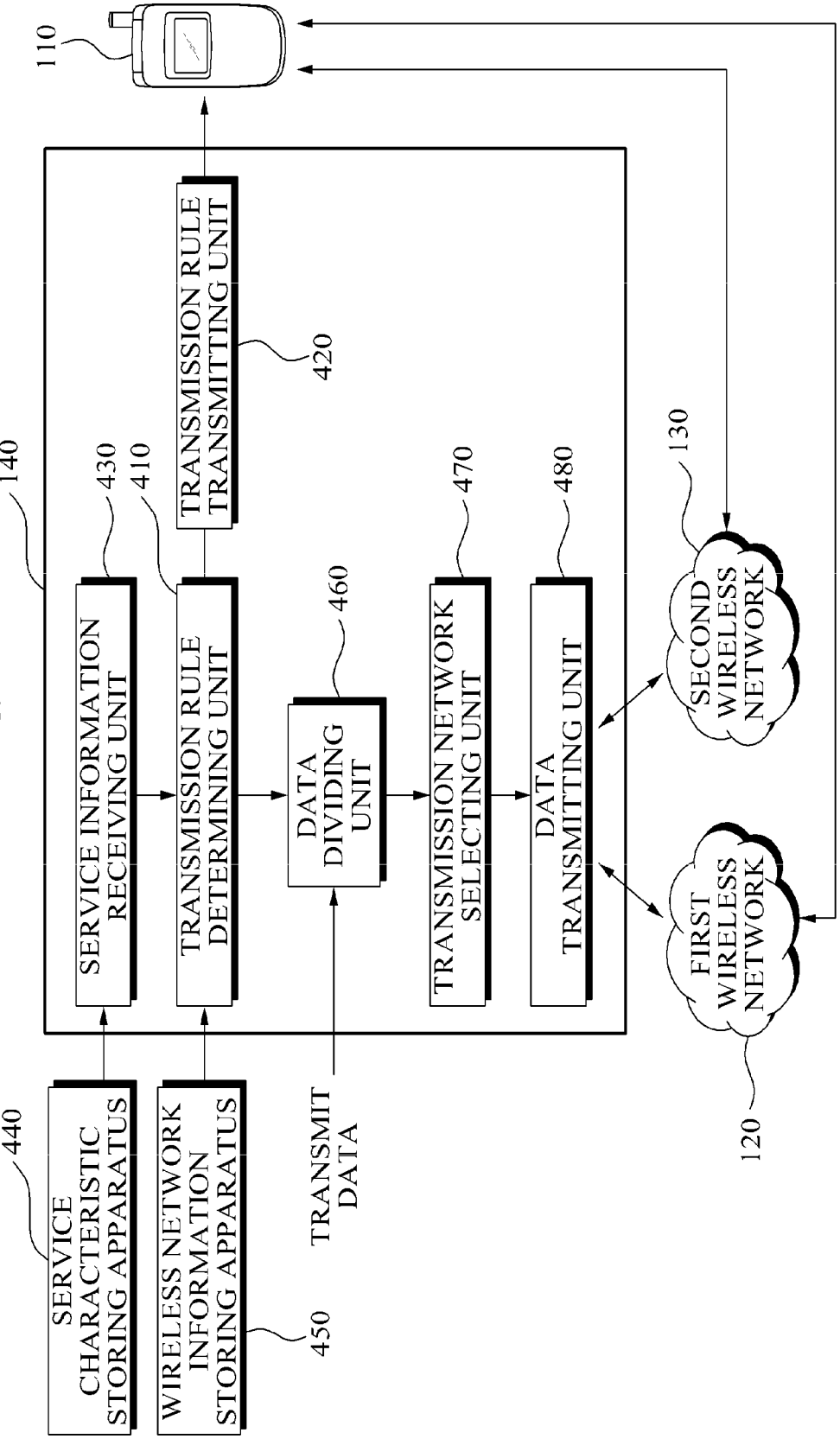
FIG. 4 is block diagram illustrating a structure of a network apparatus to determine a data transmission rule for distributing data traffic, and to transmit the determined data transmission rule to a terminal according to an exemplary embodiment.

FIG. 4 is block diagram illustrating a structure of a network apparatus 140 to determine a data transmission rule for distributing data traffic, and to transmit the determined data transmission rule to a terminal 110 according to an exemplary embodiment. The network apparatus 140 according to an exemplary embodiment includes a transmission rule determining unit 410, a transmission rule transmitting unit 420, a service information receiving unit 430, a data dividing unit 460, a transmission network selecting unit 470, and a data transmitting unit 480.

The transmission rule determining unit 410 determines the data transmission rule with respect to the plurality of wireless networks 120 and 130.

Where the terminal 110 determines the data transmission rule, the terminal may be easily aware of information about an application associated with transmission data or information about a service associated with the transmission data. Accordingly, even where service information is not received from a service characteristic storing apparatus 440, the terminal 110 may determine the data transmission rule based on a service characteristic associated with the transmission data.

Since the network apparatus 140 does not directly implement the application associated with the transmission data, the network apparatus 140 may not be aware of the information about the application associated with the transmission data or information about the service characteristic of the service associated with the transmission data. According to an exemplary embodiment, the transmission rule determining unit may receive service characteristic information from the service characteristic storing apparatus 440, and determine the data transmission rule based on the received service information.

The service characteristic storing apparatus 440 stores the service characteristic information including QoS information about the service associated with the transmission data or minimum bandwidth information about the service associated with the transmission data. According to another exemplary embodiment, the transmission rule determining unit 410 determines the data transmission rule based on the QoS information about the service associated with the transmission data or the minimum bandwidth information about the service associated with the transmission data. Where the service associated with the transmission data is a voice service, the transmission rule determining unit 410 may determine the data transmission rule to transmit the transmission data to the wireless network providing a narrow bandwidth from among the plurality of wireless networks based on the minimum bandwidth information requested by the voice service. Also, where the service associated with the transmission data is credit information of a user or financial information of the user, and a high QoS is requested, the transmission rule determining unit 410 may determine the data transmission rule to transmit the transmission data to the wireless network supporting an ARQ scheme.

According to an exemplary embodiment, the transmission rule determining unit 410 may receive, from a network information storing apparatus 450, wireless network information including at least one of an error rate with respect to the plurality of wireless networks 120 and 130, data traffic information with respect to the plurality of wireless networks 120 and 130, and a transmission delay time with respect to the plurality of wireless networks 120 and 130, and may determine the data transmission rule based on the received network information.

According to an exemplary embodiment, the transmission rule determining unit 410 may determine the data transmission rule to enable the credit information of the user, the financial information of the user, and the like, to pass through the wireless network having a low error rate. The transmission rule determining unit 410 may determine the data transmission rule to transmit the data to the wireless network having low data traffic. The transmission rule determining unit 410 may determine the data transmission rule to transmit voice data sensitive to the transmission delay time to the wireless network having short transmission delay.

The data dividing unit 460 divides the transmission data into a plurality of transmission data groups based on the data transmission rule determined by the transmission rule determining unit 410.

The transmission network selecting unit 470 selects an individual transmission network for each divided transmission data group from the plurality of wireless networks based on the determined data transmission rule.

The data transmitting unit 480 transmits each transmission data group to the terminal 110 via the transmission network selected for each divided transmission data group.

According to an exemplary embodiment, the transmission rule transmitting unit 420 transmits, to the terminal 110, the data transmission rule determined by the transmission rule determining unit 410, and the plurality of transmission data groups transmitted to the terminal 110 is recomposed into the transmission data based on the transmitted data transmission rule.

According to an exemplary embodiment, the transmission rule transmitting unit 420 encrypts the data transmission rule and transmits the data transmission rule to the terminal 110.

The network apparatus 140 may update the data transmission rule to appropriately and distributively transmit the data to the plurality of wireless networks 120 and 130 based on states of the plurality of wireless networks 120 and 130, a service characteristic with respect to a service used by the terminal 110, and the like. Where the network apparatus 140 updates the data transmission rule and distributively transmits the data based on the updated data transmission rule, the terminal 110 may recompose the distributively-transmitted data based on the data transmission rule.

The network apparatus 140 may transmit, to the terminal 110, the data transmission rule for distributively transmitting the data using the transmission rule transmitting unit 420, and may distributively transmit the data using the data transmitting unit 480 referring to the data transmission rule.

Figure 5:
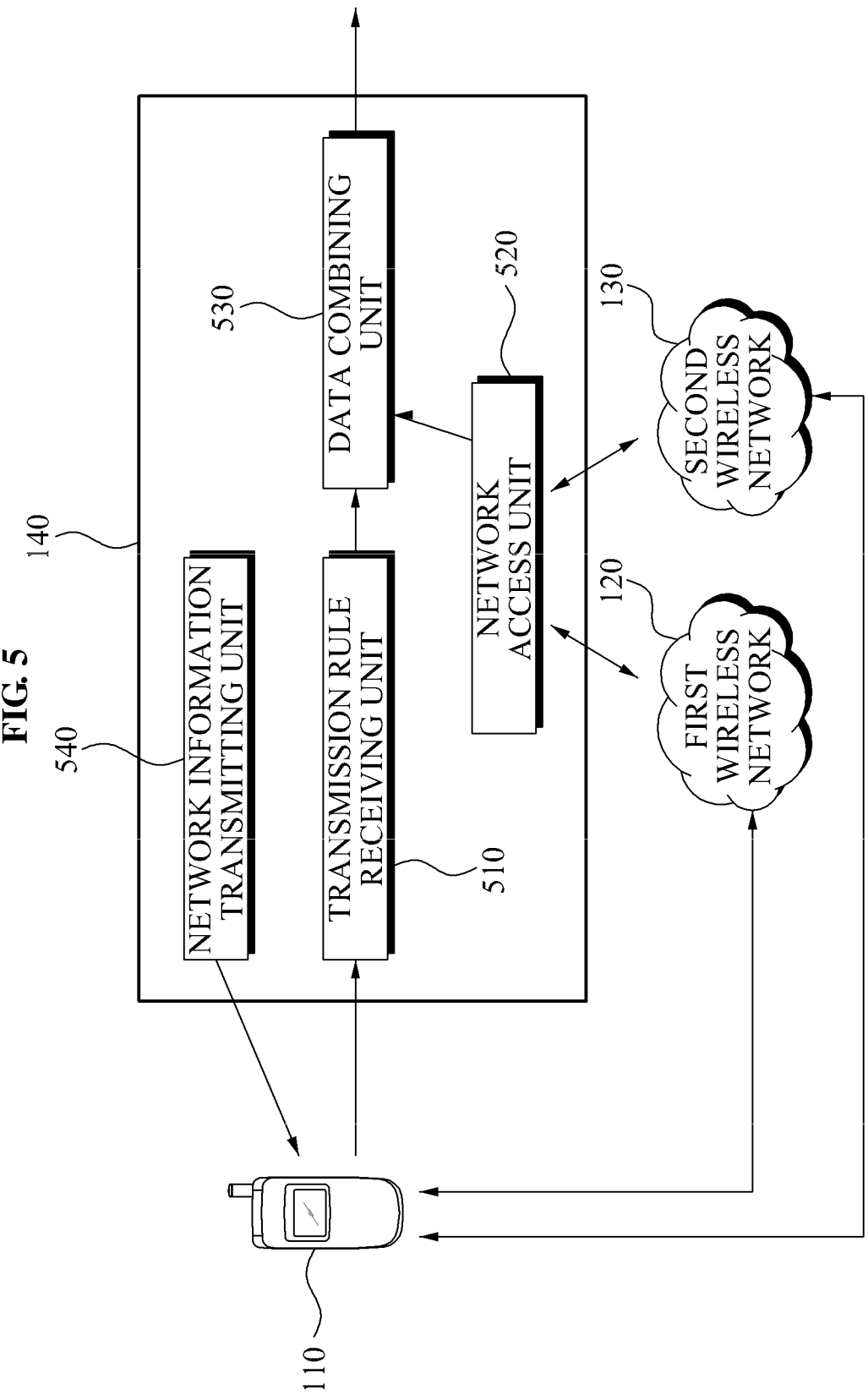
FIG. 5 is a block diagram illustrating a structure of a network apparatus to receive a data transmission rule for distributing data traffic according to an exemplary embodiment.

FIG. 5 is a block diagram illustrating a structure of a network apparatus 140 to receive a data transmission rule for distributing data traffic according to an exemplary embodiment. The network apparatus 140 according to an exemplary embodiment includes a transmission rule receiving unit 510, a network access unit 520, a data combining unit 530, and a network information transmitting unit 540.

The transmission rule receiving unit 510 receives the data transmission rule from a terminal 110.

The network access unit 520 receives, from the terminal 110 via a plurality of wireless networks 120 and 130, data divided into a plurality of received data groups. The terminal 110 may distributively transmit the data to the plurality of wireless networks 120 and 130 for efficiently using the plurality of wireless networks 120 and 130.

The data combining unit 530 may recompose the received data from the plurality of received data groups based on the data transmission rule received by the transmission rule receiving unit 510.

According to an exemplary embodiment, where the terminal 110 updates the data transmission rule based on a plurality of applications associated with the received data or a service characteristic of a service associated with the received data, and distributively transmits the data via the plurality of wireless networks 120 and 130 by applying the updated data transmission rule, the network apparatus 140 may recompose the received data being distributively transmitted based on the data transmission rule.

According to an exemplary embodiment, the transmission rule receiving unit 510 may receive an encrypted data transmission rule. Where credit information of a user, personal information, and the like are included in the data distributively transmitted from the terminal 110, a third person may acquire the credit information of the user, the personal information, and the like based on the data transmission rule when the third person other than the terminal 110 and the network apparatus 140 knows the data transmission rule. The transmission rule receiving unit 510 may receive the encrypted data transmission rule, thereby preventing the information of the user from being exposed to the third person.

The transmission rule receiving unit 510 may receive the data transmission rule encrypted based on an IKE/IPsec encryption protocol, and decrypt the data transmission rule by a decryption method corresponding to an encryption method.

The network information transmitting unit 540 transmits, to the terminal 110, network information including at least one of an error rate with respect to the plurality of wireless networks 120 and 130, data traffic information with respect to the plurality of wireless networks 120 and 130, and a transmission delay time with respect to the plurality of wireless networks 120 and 130. The terminal 110 may receive the network information, and determine the data transmission rule based on the network information. The network apparatus 140 may receive the data transmission rule from the terminal 110.

The network apparatus 140 according to an exemplary embodiment may receive, from the terminal 110, the data transmission rule for distributively transmitting the data using the transmission rule receiving unit 510, and may combine the data distributively transmitted using the network access unit 520 referring to the received data transmission rule.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A terminal for transmitting data to a plurality of mobile telephone wireless networks, the terminal comprising:
    a transmission rule storing unit configured to store a data transmission rule with respect to the plurality of mobile telephone wireless networks;
    a data dividing unit configured to divide first data of a same type into a plurality of first data groups based on the stored data transmission rule;
    a transmission network selecting unit configured to select an individual transmission network for each of said divided first data groups from the plurality of mobile telephone wireless networks based on the stored data transmission rule; and
    a network access unit configured to transmit each of said divided first data groups to the selected transmission network.

2. The terminal of claim 1, further comprising:
    a transmission rule determining unit configured to determine the data transmission rule with respect to the plurality of mobile telephone wireless networks; and
    a transmission rule transmitting unit configured to transmit the determined data transmission rule to a network apparatus for controlling the plurality of mobile telephone wireless networks,
    wherein the transmission rule storing unit stores the determined data transmission rule, and
    the plurality of first data groups transmitted to the network apparatus is recomposed into the first data based on the transmitted data transmission rule.

3. The terminal of claim 2, wherein the first data includes data respectively generated by a plurality of applications, and the transmission rule determining unit determines the data transmission rule based on a characteristic of the plurality of applications.

4. The terminal of claim 2, wherein the transmission rule determining unit determines the data transmission rule based on Quality of Service (QoS) information about a service associated with the first data or minimum bandwidth information about the service associated with the first data.

5. The terminal of claim 2, further comprising:
    a network information receiving unit configured to receive, from the network apparatus, network information including at least one of an error rate with respect to the plurality of mobile telephone wireless networks, data traffic information with respect to the plurality of mobile telephone wireless networks, and a transmission delay time with respect to the plurality of wireless networks,
    wherein the transmission rule determining unit determines the data transmission rule based on the received network information.

6. The terminal of claim 2, wherein the transmission rule transmitting unit encrypts and transmits the data transmission rule based on a predetermined encryption scheme.

7. The terminal of claim 6, wherein the transmission rule transmitting unit encrypts the data transmission rule based on an encryption protocol of Internet Key Exchange (IKE) or Internet Protocol security protocol (IPsec).

8. The terminal of claim 1, further comprising:
a transmission rule receiving unit configured to receive the data transmission rule with respect to the plurality of mobile telephone wireless networks; and
a data combining unit,
wherein the transmission rule storing unit stores the received data transmission rule,
the network access unit receives second data divided into a plurality of second data groups via the plurality of mobile telephone wireless networks based on the data transmission rule, and
the data combining unit recomposes the second data from the plurality of second data groups based on the data transmission rule.

9. The terminal of claim 8, wherein the transmission rule receiving unit receives the data transmission rule encrypted based on a predetermined encryption scheme.

10. The terminal of claim 1, wherein the data dividing unit divides first data into a plurality of first data groups according to the type of data of the first data based on the stored data transmission rule.

11. A network apparatus comprising:
a transmission rule receiving unit configured to receive a data transmission rule transmitted from a terminal;
a data receiving unit configured to receive, from the terminal via a plurality of mobile telephone wireless networks, data divided into a plurality of received data groups; and
a network access unit configured to recompose the received data from the plurality of received divided data groups into said data based on the received data transmission rule.

12. The network apparatus of claim 11, wherein the transmission rule receiving unit receives an encrypted data transmission rule.

13. The network apparatus of claim 11, further comprising:
a network information transmitting unit configured to transmit, to the terminal, network information including at least one of an error rate with respect to the plurality of mobile telephone wireless networks, data traffic information with respect to the plurality of mobile telephone wireless networks, and a transmission delay time with respect to the plurality of mobile telephone wireless networks,
wherein the transmission rule receiving unit receives the data transmission rule determined based on the transmitted network information.

14. A network apparatus for controlling a plurality of mobile telephone wireless networks accessing a terminal, the network apparatus comprising:
a transmission rule determining unit configured to determine a data transmission rule with respect to the plurality of mobile telephone wireless networks;
a data dividing unit configured to divide transmission data of a same type into a plurality of transmission data groups based on the determined data transmission rule;
a transmission network selecting unit configured to select an individual transmission network for each of said divided transmission data groups from the plurality of mobile telephone wireless networks based on the determined data transmission rule; and
a data transmitting unit configured to transmit each of said divided transmission data groups to the terminal via the selected transmission network.

15. The network apparatus of claim 14, further comprising:
a transmission rule transmitting unit configured to transmit, to the terminal, the determined data transmission rule,
wherein the plurality of transmission data groups transmitted to the terminal is recomposed into the transmission data based on the transmitted data transmission rule.

16. The network apparatus of claim 15, wherein the transmission rule transmitting unit encrypts and transmits the data transmission rule.

17. The network apparatus of claim 14, further comprising:
a service information receiving unit configured to receive, from a service characteristic storing apparatus, service characteristic information including QoS information about a service associated with the transmission data or minimum bandwidth information about the service associated with the transmission data,
wherein the transmission rule determining unit determines the data transmission rule based on the received service characteristic information.

18. The network apparatus of claim 14, wherein the transmission rule determining unit determines the transmission rule based on at least one of an error rate with respect to the plurality of mobile telephone wireless networks, data traffic information with respect to the plurality of mobile telephone wireless networks, and a transmission delay time with respect to the plurality of mobile telephone wireless networks.

19. The network apparatus of claim 14, wherein the transmission rule determining unit is configured to determine the data transmission rule to transmit transmission data supporting an Automatic Repeat reQuest (ARQ) scheme.

* * * * *